(12) United States Patent
Qi et al.

(10) Patent No.: US 12,646,923 B2
(45) Date of Patent: Jun. 2, 2026

(54) CIRCUIT PROTECTION METHOD, SYSTEM AND APPARATUS

(71) Applicant: ALTENERGY POWER SYSTEM INC., Jiaxing (CN)

(72) Inventors: Biaojie Qi, Jiaxing (CN); Yongchun Yang, Jiaxing (CN); Yuhao Luo, Jiaxing (CN); Jian Wu, Jiaxing (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 353 days.

(21) Appl. No.: 18/266,588

(22) PCT Filed: Dec. 9, 2021

(86) PCT No.: PCT/CN2021/136698
§ 371 (c)(1),
(2) Date: Jun. 10, 2023

(87) PCT Pub. No.: WO2022/121976
PCT Pub. Date: Jun. 16, 2022

(65) Prior Publication Data
US 2024/0055853 A1 Feb. 15, 2024

(30) Foreign Application Priority Data
Dec. 10, 2020 (CN) .......................... 202011434903.2

(51) Int. Cl.
*H02H 7/122* (2006.01)
*H02M 1/00* (2007.01)
*H02M 7/5387* (2007.01)

(52) U.S. Cl.
CPC .......... *H02H 7/122* (2013.01); *H02M 7/5387* (2013.01); *H02M 1/0009* (2021.05)

(58) Field of Classification Search
CPC .... H02M 1/0009; H02M 7/5387; H02M 1/12; H02H 7/122
See application file for complete search history.

(56) References Cited

U.S. PATENT DOCUMENTS

2005/0105314 A1    5/2005  Nielsen
2009/0146635 A1*   6/2009  Qiu ........................ H02M 3/156
                                                  323/290
(Continued)

FOREIGN PATENT DOCUMENTS

CN        103078485 A      5/2013
CN        103916040 A      7/2014
(Continued)

OTHER PUBLICATIONS

The European search report issued on Sep. 27, 2024 for EP21902681.2.
(Continued)

*Primary Examiner* — Jue Zhang
(74) *Attorney, Agent, or Firm* — Yue (Robert) Xu; Apex Attorneys at Law, LLP

(57) ABSTRACT

A circuit protection method, system, and apparatus are provided. The method includes: receiving a current between an output terminal of the inverter circuit and a power grid; determining, based on the current, whether a current abnormality occurs; and controlling to switch off switch transistors in the inverter circuit, on determining that a current abnormality occurs.

11 Claims, 7 Drawing Sheets

(56)       References Cited

U.S. PATENT DOCUMENTS

| | | |
|---|---|---|
| 2013/0336025 A1 | 12/2013 | Figueroa et al. |
| 2014/0003103 A1 | 1/2014 | Aaltio |
| 2017/0237262 A1 | 8/2017 | Geng et al. |
| 2018/0205309 A1 | 7/2018 | Bleus et al. |
| 2021/0044198 A1 | 2/2021 | Chen et al. |

FOREIGN PATENT DOCUMENTS

| | | | | |
|---|---|---|---|---|
| CN | 104518697 A | | 4/2015 | |
| CN | 106655099 A | | 5/2017 | |
| CN | 107102247 A | * | 8/2017 | .......... G01R 31/008 |
| CN | 107611935 A | | 1/2018 | |
| CN | 107612302 B | | 1/2018 | |
| CN | 106655099 B | * | 4/2019 | ............ H02H 7/122 |
| CN | 110311581 A | | 10/2019 | |
| CN | 107852087 B | | 5/2020 | |
| CN | 111800031 A | | 10/2020 | |
| CN | 112600170 A | | 4/2021 | |
| JP | H09135583 A | * | 5/1997 | |
| KR | 20170093653 A | | 8/2017 | |
| KR | 101804469 B1 | | 12/2017 | |

OTHER PUBLICATIONS

International Search Report for PCT/CN2021/136698 mailed Jan. 28, 2022, ISA/CN.

The European 1st Office Action issued on Mar. 12, 2026 for EP21902681.2.

* cited by examiner

CIRCUIT PROTECTION METHOD, SYSTEM AND APPARATUS

CROSS REFERENCE OF RELATED APPLICATION

The application is the national phase of International Application No. PCT/CN2021/136698, titled "CIRCUIT PROTECTION METHOD, SYSTEM AND APPARATUS", filed on Dec. 9, 2021, which claims priority to Chinese Patent Application No. 202011434903.2, titled "CIRCUIT PROTECTION METHOD, SYSTEM AND APPARATUS", filed on Dec. 10, 2020 with the China National Intellectual Property Administration, both of which are incorporated herein by reference in their entireties.

FIELD

The present disclosure relates to the field of electric energy conversion, and in particular to a circuit protection method, a circuit protection system, and a circuit protection apparatus.

BACKGROUND

According to a conventional technology, an inverter circuit includes switch transistors, bulk diodes connected to the switch transistors, respectively, and a filter inductor at an output terminal. FIG. 1 is a schematic structural diagram of an inverter circuit according to a conventional technology. As shown in FIG. 1, the inverter circuit includes four switch transistors, namely Q1, Q2, Q3 and Q4 as in FIG. 1. Each of the switch transistors is connected in parallel with a bulk diode. A first filter inductor L1 is connected with a first output terminal of the inverter circuit and a power grid. A second filter inductor L2 is connected with a second output terminal of the inverter circuit and the power grid. In order to avoid damage to the switch transistors due to overcurrent in the circuit, two resistors, i.e., a first detection resistor R1 and a second detection resistor R2 as in FIG. 1, are connected in series in two bridge arms of the inverter circuit, respectively, for detecting currents through the bridge arms from top to bottom. In a case that a detected current exceeds a set value, a control signal is sent for switching off the switch transistors Q1, Q2, Q3 and Q4, so as to avoid damage to the switch transistors.

Improvement may be made based on the inverter circuit according to the conventional technology. For example, a filter capacitor is connected to the output terminal of the inverter circuit, as shown in FIG. 2. FIG. 2 is a schematic structural diagram of a topology of an inverter circuit according to the present disclosure. Compared to the conventional technology, the output terminal of the inverter circuit in FIG. 2 are connected to a first filter capacitor C1 and a second filter capacitor C2, and an end of the first filter capacitor C1 and an end of the second filter capacitor C2 are connected to a negative electrode of a bus capacitor $V_{dc}$. With this circuit, in a case that an instantaneous high voltage, for example, a surge voltage, is generated between a live line L and a neutral line N of the power grid, the live line L, the first filter capacitor C1, the second filter capacitor C2 and the neutral line N may form a loop, and no current flows through the first detection resistor R1 and the second detection resistor R2. Reference is made to FIG. 3, which is a schematic diagram showing a current flow in a case that a current abnormality occurs according to the present disclosure. Arrows in FIG. 3 indicate directions of the current flow in a case that a current abnormality occurs. Therefore, the first detection resistor R1 and the second detection resistor R2 cannot detect the surge voltage generated between the live line L and the neutral line N of the power grid, and the switch transistors cannot be protected, resulting in damage to the switch transistors. In addition, in a case that a surge voltage is generated between the live line L and the neutral line N of the power grid, the live line L, the first filter capacitor C1, the second filter capacitor R2, a bulk diode connected to the switch transistor Q4, the second filter inductor L2 and the neutral line N may form a loop. Reference is made to FIG. 4, which is a schematic diagram showing a current flow in a case that a current abnormality occurs according to the present disclosure. Arrows in FIG. 4 indicate directions of the current flow in a case that a current abnormality occurs. A current flows through R2 from bottom to top. However, R2 can detect only a current flowing from top to bottom, and cannot detect the current flowing from bottom to top. Therefore, the switch transistors cannot be protected, resulting in damage to the switch transistors.

SUMMARY

An objective of the present disclosure is to provide a circuit protection method, a circuit protection system, and a circuit protection apparatus, with which it can be determined, based on a current between an output terminal of an inverter circuit and a power grid, whether a current abnormality occurs in a bridge arm of the inverter circuit, and whether a current abnormality occurs at the output terminal of the inverter circuit. Thereby, protection on switch transistors is realized.

In order to solve the above technical problems, a circuit protection method is provided according to the present disclosure. The method is applied to an inverter circuit. The method includes: receiving a current between an output terminal of the inverter circuit and a power grid; determining, based on the current, whether a current abnormality occurs; and controlling to switch off switch transistors in the inverter circuit, on determining that a current abnormality occurs.

Preferably, the inverter circuit is a single-phase inverter circuit. The receiving a current between an output terminal of the inverter circuit and a power grid includes: receiving a first current between a first output terminal of the inverter circuit and a live line of the power grid, and a second current flowing between a second output terminal of the inverter circuit and a neutral line of the power grid. The determining, based on the current, whether a current abnormality occurs includes: determining based on at least one of the first current and the second current, whether a current abnormality occurs; and proceeding to the controlling to switch off switch transistors in the inverter circuit, on determining that the current abnormality occurs.

Preferably, the inverter circuit is a three-phase inverter circuit. The receiving a current between an output terminal of the inverter circuit and a power grid includes: receiving a first current between a first output terminal of the inverter circuit and phase a of the power grid, a second current between a second output terminal of the inverter circuit and phase b of the power grid, and a third current flowing between a third output terminal of the inverter circuit and phase c of the power grid. The determining, based on the current, whether a current abnormality occurs includes: determining, based on one or more of the first current, the second current, and the third current, whether the current abnormality occurs; and controlling to the controlling to switch off switch transistors in the inverter circuit, on determining that a current abnormality occurs.

Preferably, a filter inductor is connected with the output terminal of the inverter circuit and the power grid. The receiving a current between an output terminal of the inverter circuit and a power grid includes: receiving a voltage across the filter inductor; and determining, based on the voltage across the filter inductor, the current flowing between the output terminal of the inverter circuit and the power grid.

Preferably, the inverter circuit is a single-phase inverter circuit. A filter inductor is connected with the output terminal of the inverter circuit and the power grid. A filter capacitor is connected to the output terminal of the inverter circuit. A first terminal of the filter capacitor is connected to a second terminal of the filter inductor and the power grid. A second terminal of the filter capacitor is connected to a negative electrode of a bus capacitor of the inverter circuit. The receiving a current between an output terminal of the inverter circuit and a power grid includes: receiving a current between the power grid and both the filter capacitor and the filter inductor.

Preferably, the determining, based on the current, whether a current abnormality occurs includes: comparing the current with a set current, and determining that the current abnormality occurs in a case that the current is greater than the set current.

Preferably, after the receiving a current between an output terminal of the inverter circuit and a power grid, the method further includes: detecting a power frequency signal from the current; calculating a direct current component based on the power frequency signal; determining whether the direct current component is greater than a preset direct current; and controlling to switch off the switch transistors in the inverter circuit, in a case that the direct current component is greater than the preset direct current.

In order to solve the above technical solutions, a circuit protection system is provided according to the present disclosure. The system includes: a signal receiving unit, configured to receive a current between an output terminal of an inverter circuit and a power grid; a determination unit, configured to determine, based on the current, whether a current abnormality occurs, and trigger a control unit on determining that the current abnormality occurs; and the control unit, configured to control to switch off switch transistors in the inverter circuit.

In order to solve the above technical solutions, a circuit protection apparatus is provided according to the present disclosure. The apparatus includes: a memory storing a computer program; and a processor configured to execute the computer program to implement the circuit protection method as described above.

Preferably, the circuit protection apparatus further includes: a current detection module, configured to detect a current between an output terminal of an inverter circuit and a power grid; a comparator, configured to determine, based on the current, whether a current abnormality occurs; and a control module, configured to control to switch off the switch transistors in the inverter circuit, in a case that the comparator determines that the current abnormality occurs.

A circuit protection method, a circuit protection system, and a circuit protection apparatus are provided according to the present disclosure. In the solution, a current between an output terminal of the inverter circuit and the power grid is received; then it is determined, based on the current, whether a current abnormality occurs; and switch transistors in the inverter circuit are controlled to be switched off, in a case that the current abnormality occurs. Thereby, a probability of the switch transistors being damaged due to an abnormal current in the circuit is reduced. In the present disclosure, it can be determined, based on the current between the output terminal of the inverter circuit and the power grid, whether a current abnormality occurs in a bridge arm of the inverter circuit, and whether a current abnormality occurs at the output terminal of the inverter circuit. Thereby, protection on switch transistors is realized.

BRIEF DESCRIPTION OF THE DRAWINGS

In order to more clearly describe the technical solutions in the embodiments of the present disclosure, drawings to be used in description of the conventional technology or the embodiments of the present disclosure are briefly described hereinafter. It is apparent that the drawings described below are merely used for describing some of the embodiments of the present disclosure. Those skilled with ordinary skill in the art may obtain other drawings based on the drawings without any creative effort.

DETAILED DESCRIPTION OF THE EMBODIMENTS

In the present disclosure, a circuit protection method, a circuit protection system and a circuit protection apparatus are provided, with which it can be determined, based on a current between an output terminal of an inverter circuit and a power grid, whether a current abnormality occurs in a bridge arm of the inverter circuit, and whether a current abnormality occurs at the output terminal of the inverter circuit. Thereby, protection on switch transistors is realized.

In order to make the objective, the technical solutions and advantages of the embodiments of the present disclosure clear, technical solutions of embodiments of the present disclosure are described below in conjunction with the drawings of the embodiments of the present disclosure. Apparently, the embodiments described below are only some embodiments rather than all the embodiments of the present disclosure. Any other embodiments obtained by those skilled in the art based on the embodiments in the present disclosure without any creative effort fall within the protection scope of the present disclosure.

Figure 5:
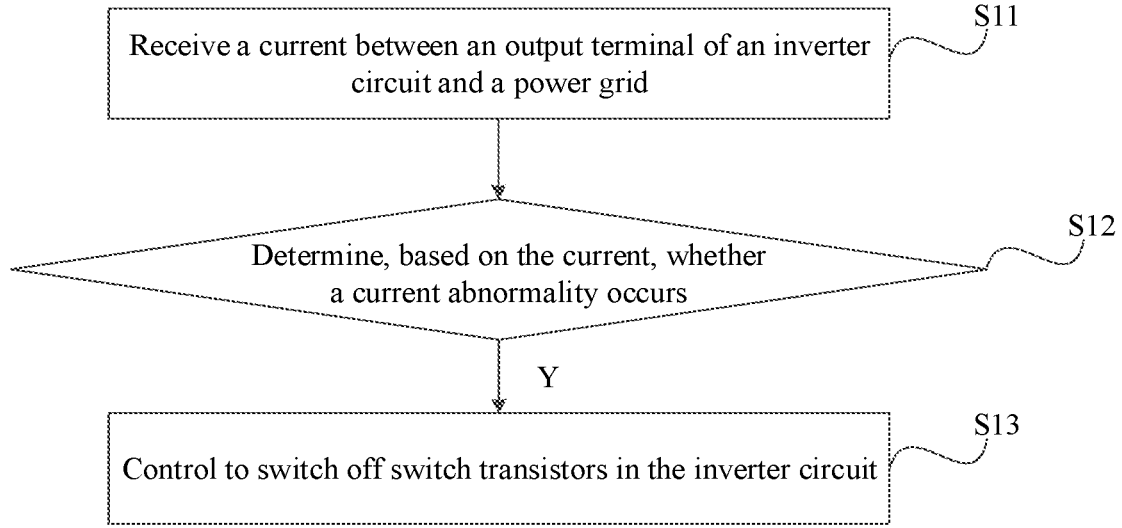
FIG. 5 is a schematic flowchart of a circuit protection method according to an embodiment of the present disclosure.

Reference is made to FIG. 5, which is a schematic flowchart of a circuit protection method according to an embodiment of the present disclosure. The method is applied to an inverter circuit. The method includes the following steps S11 to S13.

In step S11, a current between an output terminal of an inverter circuit and a power grid is received.

Figure 1:
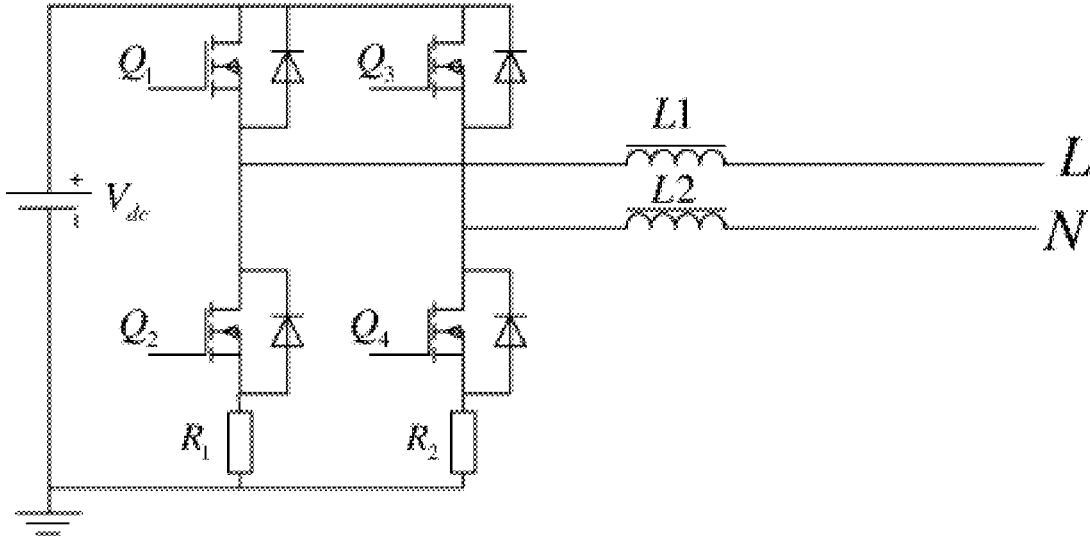
FIG. 1 is a schematic structural diagram of an inverter circuit according to the conventional technology.

In an inverter circuit according to a conventional technology, a detection resistor is usually connected in series in each bridge arm of the inverter circuit. As shown in FIG. 1, the circuit includes a first detection resistor R1 and a second detection resistor R2. A current in the first detection resistor R1 is determined based on a voltage across the first detection resistor R1 and a current in the second detection resistor R2 is determined based on a voltage across the second detection resistor R2, so as to determine whether a current abnormality occurs in the inverter circuit. On determining that the current abnormality occurs, the switch transistors in the inverter circuit are controlled to be switched off. Therefore, the inverter circuit is protected.

Figure 2:
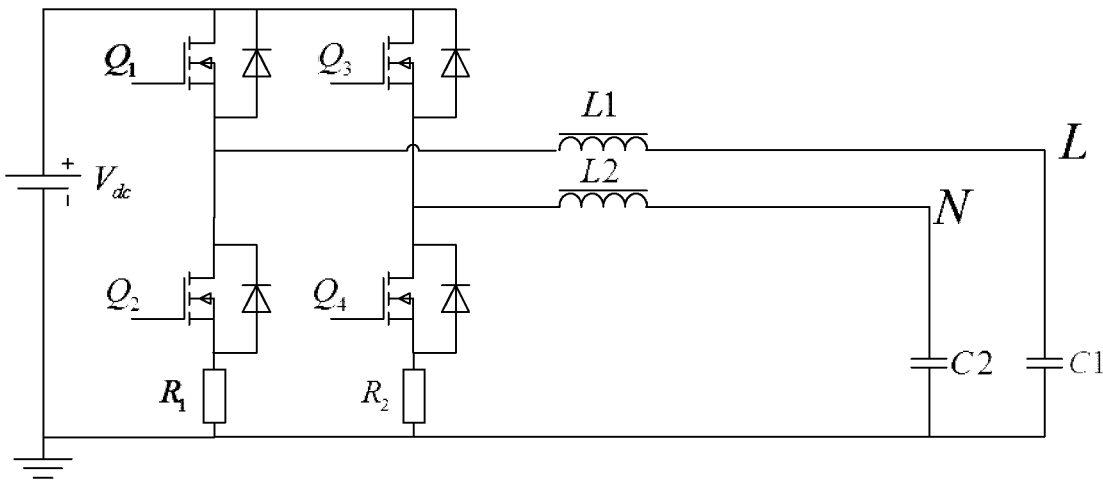
FIG. 2 is a schematic structural diagram of a topology of an inverter circuit according to an embodiment of the present disclosure.
Figure 3:
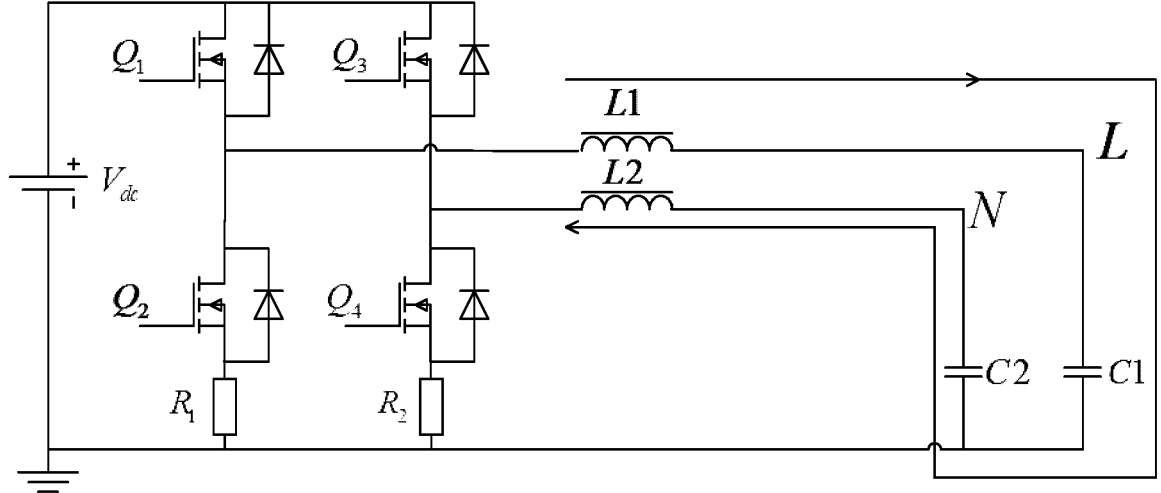
FIG. 3 is a schematic diagram showing a current flow in a case of a current abnormality according to an embodiment of the present disclosure.
Figure 4:
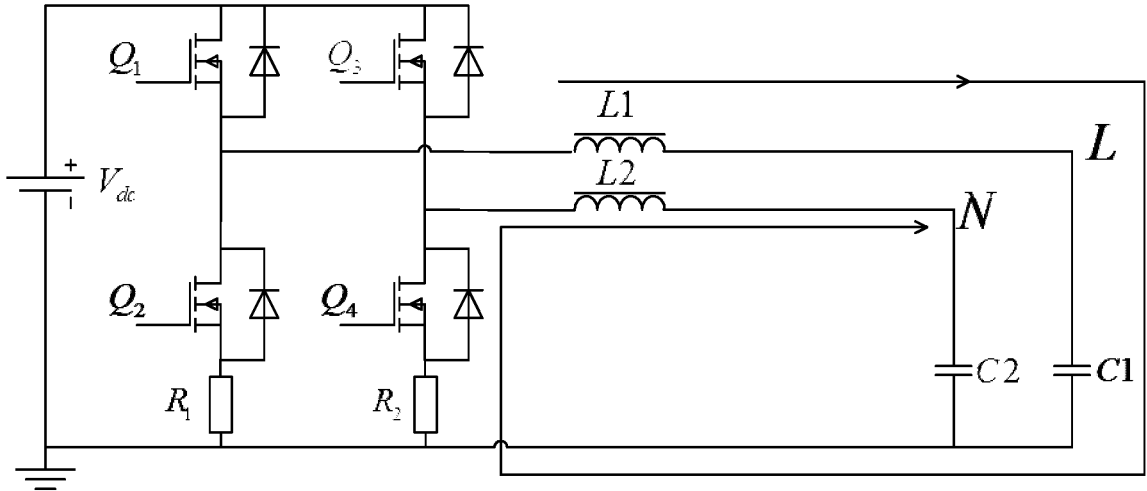
FIG. 4 is a schematic diagram showing a current flow in a case of a current abnormality according to another embodiment of the present disclosure.

Based on the inverter circuit according to the conventional technology, a topology of the inverter circuit according to the present disclosure is further provided with a filter capacitor. Reference is made to FIG. 2. The inverter circuit in FIG. 2 is a single-phase inverter circuit. A first filter capacitor C1 and a second filter capacitor C2 are disposed at an output terminal of the single-phase inverter circuit. A first terminal of the first filter capacitor C1 is connected to a first output terminal of the single-phase inverter circuit and a live line L of a power grid. A second terminal of the first filter capacitor C1 is connected to a negative electrode of a bus capacitor $V_{dc}$ of the inverter circuit. A first terminal of the second filter capacitor C2 is connected to a second output terminal of the single-phase inverter circuit and a neutral line N of the power grid. A second terminal of the second filter capacitor C2 is connected to the negative electrode of the bus capacitor $V_{dc}$ of the inverter circuit. Therefore, in a case that a surge voltage, for example, is generated between the neutral line N and the live line L of the power grid, the live line L, the first filter capacitor C1, the second filter capacitor C2 and the neutral line N of the power grid may directly form a loop, as shown in FIG. 3. In this case, the first detection resistor R1 and the second detection resistor R2 cannot detect the surge voltage between the neutral line N and the live line L of the power grid. In another case that a surge voltage is generated between the neutral line N and the live line L of the power grid, the live line L, the first filter capacitor C1, the second detection resistor R2, the bulk diode connected to the switch transistor Q4, the second filter inductor L2 and the neutral line N of the power grid may directly form a loop, as shown in FIG. 4. Since the current flows through R2 from bottom to top, R2 cannot detect the surge voltage between the neutral line N and the live line L of the power grid. That is, not all current abnormalities can be detected by the first detection resistor R1 and the second detection resistor R2.

In order to solve the above-mentioned problems, in the present disclosure, the current between the output terminal of the inverter circuit and the power grid is received, for determining whether a current abnormality occurs in the inverter circuit.

It should be noted that a filter inductor is connected with the output terminal of the inverter circuit and the power grid. A first filter inductor L1 is connected with a first output terminal of the inverter circuit and the live line L of the power grid. A second filter inductor L2 is connected with a second output terminal of the inverter circuit and the neutral line N of the power grid.

In step S12, it is determined, based on the current, whether a current abnormality occurs, and the method proceeds to step S13 in a case that a current abnormality occurs.

After the current between the output terminal of the inverter circuit and the power grid is received, it may be determined, based on the current, whether a current abnormality occurs. For example, in a case that a surge voltage is generated between the neutral line N and the live line L of the power grid, there may be a leakage current between the output terminal of the inverter circuit and the power grid. In this case, a current abnormality may be detected, and therefore components in the inverter circuit are protected. In a case that no current abnormality is detected, the steps of receiving the current between the output terminal of the inverter circuit and the power grid and determining whether a current abnormality occurs are maintained.

In addition, the current abnormality in the present disclosure may include, but is not limited to occurrence of a leakage current.

In step S13, switch transistors in the inverter circuit are controlled to be switched off.

In a case that it is determined in the previous step that a current abnormality occurs in the inverter circuit, the switch transistors in the inverter circuit are controlled to be switched off. Therefore, protection on the switch transistors is achieved.

The inverter circuit according to the conventional technology generally operates in a continuous mode. In the continuous mode, a current flowing through the filter inductor is not zero at an end of each switching period of a switch transistor. In this case, a period of a detection resistor detecting a current in the circuit is the same as an on-off period of the switch transistor, which is usually at a level of hundred microseconds. The inverter circuit according to the present disclosure, when operating in an intermittent mode or critical continuous mode by controlling a peak current, has a small inductance of the filter inductor in the inverter circuit, equal to or less than one-tenth of an inductance of the filter inductor in the inverter circuit according to the conventional technology. Further, a voltage supplied from the bus voltage $V_{dc}$ and a power grid voltage to the filter inductor in the inverter circuit according to the present disclosure is equal to a voltage supplied from the bus voltage $V_{dc}$ and a power grid voltage to the filter inductor in the inverter circuit according to the conventional technology. Therefore, a rate of change of the current in the inverter circuit according to the present disclosure is equal to or greater than 10 times a rate of change of the current in the inverter circuit according to the conventional technology. Therefore, a detection speed of the detection resistor according to the conventional technology cannot realize an in-time detection of a current change in the inverter circuit according to the present disclosure.

In the present disclosure, a detection period of detecting the current between the output terminal of the inverter circuit and the power grid is far less than a switching period of the switch transistor, and is synchronized with a detection speed of the peak current. The peak current control is to detect the current in real time and determine a time instant for switching off the switch transistor. For example, the switch transistors are switched off immediately when it is detected that the current rises to a set value, so that the switch transistors are protected. In the present disclosure, a process of receiving the current, determining based on the current whether the current abnormality occurs, and controlling the switch transistors in the inverter circuit takes a time period at a level of nanoseconds. Therefore, with the circuit protection method according to the present disclosure, the current between the output terminal of the inverter circuit and the power grid can be detected in real time, and the switch transistors can be controlled for protection.

In addition, in the present disclosure, a forward current or reverse current flowing through the each of two bridge arms in the inverter circuit may be detected, with less effect of a noise in the current in the bridge arm, which is conducive to accurate sampling of the current. Therefore, it is unnecessary to install the detection resistor in the inverter circuit, realizing a reduced cost and a reduced loss.

Furthermore, power grid standards in some regions require that a direct current component of the current between the inverter circuit and the power grid can be tested and a switch transistor in the inverter circuit is switched off in a case that the direct current component exceeds a standard value. Therefore, in the present disclosure, the alternating current between the output terminal of the inverter circuit and the power grid is detected, and it is determined whether a direct current component exceeds a standard value. In a case that the direct current component exceeds the standard value, the switch transistors are switched off to realize protection on the inverter circuit.

As can be seen from the above, in the present disclosure, it can be determined, based on the current between an output terminal of an inverter circuit and a power grid, whether a current abnormality occurs in the bridge arm of the inverter circuit, and whether a current abnormality occurs at the output terminal of the inverter circuit. Thereby, protection on switch transistors is realized.

Based on the above embodiments, preferred embodiments are provided below.

In a preferred embodiment, the inverter circuit is a single-phase inverter circuit. A process of receiving the current between the output terminal of the inverter circuit and the power grid includes: receiving a first current between a first output terminal of the inverter circuit and the live line L of the power grid, and a second current between a second output terminal of the inverter circuit and the neutral line N of the power grid. A process of determining, based on the current, whether a current abnormality occurs includes: determining, based on at least one of the first current and the second current, whether the current abnormality occurs, and proceeding to the process of controlling to switch off the switch transistors in the inverter circuit, on determining that the current abnormality occurs.

In the present disclosure, in a case that the inverter circuit is a single-phase inverter circuit, the first output terminal of the single-phase inverter circuit is connected to the live line L of the power grid, and the second output terminal of the single-phase inverter circuit is connected to the neutral line N of the power grid. Therefore, in the present disclosure, the first current between the first output terminal of the single-phase inverter circuit and the live line L of the power grid, and the second current between the second output terminal of the inverter circuit and the neutral line N of the power grid are detected. In a case that one or both of the first current and the second current are abnormal, the switch transistors in the inverter circuit are switched off to protect the single-phase inverter circuit.

In a preferred embodiment, the inverter circuit is a three-phase inverter circuit. The process of receiving a current between the output terminal of the inverter circuit and the power grid includes: receiving a first current between a first output terminal of the inverter circuit and phase a of the power grid, a second current between a second output terminal of the inverter circuit and phase b of the power grid, and a third current between a third output terminal of the inverter circuit and phase c of the power grid. The process of determining, based on the current, whether a current abnormality occurs includes: determining, based on one or more of the first current, the second current and the third current, whether the current abnormality occurs; and proceeding to the controlling to switch off the switch transistors in the inverter circuit, on determining that the current abnormality occurs.

In the present disclosure, in a case that the inverter circuit is a three-phase inverter circuit, the first output terminal of the three-phase inverter circuit is connected to the phase a of the power grid, the second output terminal of the three-phase inverter circuit is connected to the phase b of the power grid, and the third output terminal of the three-phase inverter circuit is connected to the phase c of the power grid. Therefore, in the present disclosure, the first current between the first output terminal of the three-phase inverter circuit and the phase a of the power grid, the second current between the second output terminal of the inverter circuit and the phase b of the power grid, and the third current between the third output terminal of the inverter circuit and the phase c of the power grid are detected. In a case that at least one or all of the first current, the second current and the third current are abnormal, the switch transistors in the inverter circuit are switched off to protect the three-phase inverter circuit.

In a preferred embodiment, a filter inductor is connected with the output terminal of the inverter circuit and the power grid. The process of receiving a current between the output terminal of the inverter circuit and the power grid includes: receiving a voltage across the filter inductor; and determining, based on the voltage across the filter inductor, the current between the output terminal of the inverter circuit and the power grid.

In the present disclosure, the voltage across the filter inductor is further detected, the current between the output terminal of the inverter circuit and the power grid is determined based on the voltage across the filter inductor, the circuit is simplified, and power consumption is reduced.

In a preferred embodiment, the inverter circuit is a single-phase inverter circuit. A filter inductor is connected with the output terminal of the inverter circuit and the power grid. A filter capacitor is connected to the output terminal of the inverter circuit. A first terminal of the filter capacitor is connected to a second terminal of the filter inductor and the power grid. A second terminal of the filter capacitor is connected to the negative electrode of the bus capacitor $V_{dc}$ of the inverter circuit. The process of receiving a current between the output terminal of the inverter circuit and the power grid includes: receiving a current between the power grid and both the filter capacitor and the filter inductor.

In the present disclosure, the current between the power grid and both the filter capacitor and the filter inductor in the inverter circuit is detected, so as to determine whether a current abnormality occurs. In addition, the current between the power grid and both the filter capacitor and the filter inductor is a power frequency current. The power frequency current can be tested, so as to determine whether the power frequency current meets a requirement of the grid standards. In a case that the power frequency current does not meet the requirement, the switch transistors are switched off to realize protection on the switch transistors.

In a preferred embodiment, the process of determining, based on the current, whether a current abnormality occurs includes: comparing the current with a set current, and determining that the current abnormality occurs in a case that the current is greater than the set current.

In the present disclosure, for determining, based on the current between the output terminal of the inverter circuit and the power grid, whether the current abnormality occurs, the current is compared with the set current. It is determined that the current abnormality occurs in a case that the current is greater than the set current, so as to facilitate subsequent protection for the switch transistors.

In a preferred embodiment, after the current between the output terminal of the inverter circuit and the power grid is received, the method further includes: detecting a power frequency signal from the current; calculating a direct current component based on the power frequency signal; determining whether the direct current component is greater than a preset direct current; and controlling to switch off the switch transistors in the inverter circuit, in a case that the direct current component is greater than the preset direct current.

Power grid standards in some regions require that a direct current component of the current between the inverter circuit and the power grid can be tested and a switch transistor in the inverter circuit is switched off in a case that the direct current component exceeds a preset direct current. Therefore, in the present disclosure, the alternating current between the output terminal of the inverter circuit and the power grid is detected, and it is determined whether a direct current component exceeds a preset direct current. In a case that the direct current component exceeds the preset direct current, the switch transistors are switched off to protect the inverter circuit.

Figure 6:
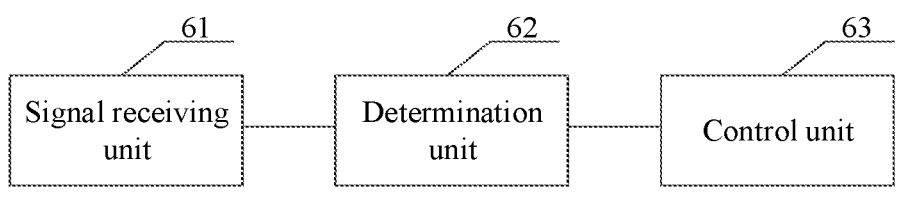
FIG. 6 is a schematic structural diagram of a circuit protection system according to an embodiment of the present disclosure.

Reference is made to FIG. 6, which is a schematic structural diagram of a circuit protection system according to an embodiment of the present disclosure. The system includes a signal receiving unit 61, a determination unit 62, and a control unit 63.

The signal receiving unit 61 is configured to receive a current between an output terminal of an inverter circuit and a power grid.

The determination unit 62 is configured to determine, based on the current, whether a current abnormality occurs, and trigger the control unit 63 on determining that the current abnormality occurs.

The control unit 63 is configured to control to switch off switch transistors in the inverter circuit.

For description of the circuit protection system according to the present disclosure, reference may be made to the method embodiments, which is not repeated here.

Figure 7:
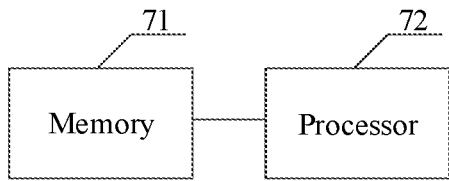
FIG. 7 is a schematic structural diagram of a circuit protection apparatus according to an embodiment of the present disclosure.

Reference is made to FIG. 7, which is a schematic structural diagram of a circuit protection apparatus according to an embodiment of the present disclosure. The apparatus includes a memory 71 and a processor 72.

The memory 71 stores a computer program.

The processor 72 is configured to execute the computer program to implement the circuit protection method as described above.

For description of the circuit protection apparatus according to the present disclosure, reference may be made to the method embodiments, which is not repeated here.

As a preferred embodiment, the circuit protection apparatus further includes a current detection module, a comparator and a control module.

The current detection module is configured to detect a current between an output terminal of the inverter circuit and the power grid.

The comparator is configured to determine, based on the current, whether the current abnormality occurs.

The control module is configured to control to switch off the switch transistors in the inverter circuit in a case that the comparator determines that the current abnormality occurs.

In the embodiment of the present disclosure, the current between the output terminal of the inverter circuit and the power grid is detected through the current detection module; it is determined, though the comparator based on the current, whether the current abnormality occurs; and the switch transistors in the inverter circuit are controlled to be switched off through the control module, in a case that the comparator determines that the current abnormality occurs. Therefore, the current can be detected and determined in real time, and the switch transistors can be controlled in time. In addition, a simple structure and each operation are realized.

In addition, the circuit protection apparatus in the present disclosure is not limited to including the current detection module, as along as the current can be detected. The circuit protection apparatus in the present disclosure is not limited to including the comparator, as along as determination on the current can be performed. The circuit protection apparatus in the present disclosure is not limited to including the control module, as along as the switch transistors can be controlled.

Figure 8:
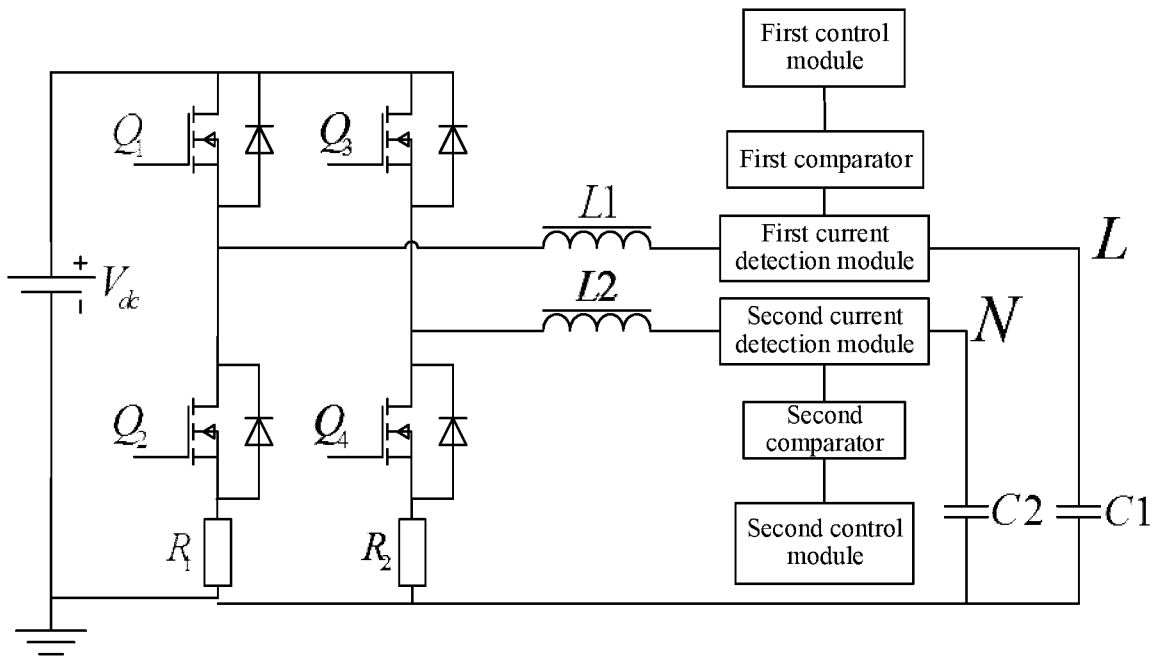
FIG. 8 is a schematic structural diagram of a protection circuit applied to a single-phase inverter circuit according to an embodiment of the present disclosure.

In a case that the inverter circuit is a single-phase inverter circuit, a specific circuit structure is as shown in FIG. 8. FIG. 8 is a schematic structural diagram of a protection circuit applied to a single-phase inverter circuit according to an embodiment of the present disclosure. In FIG. 8, a first current detection module is configured to detect a current between a first output terminal of the inverter circuit and a live line L of a power grid; and a second current detection module is configured to detect a current between a second output terminal of the inverter circuit and a neutral line N of the power grid. The inverter circuit in FIG. 8 may not be provided with the first detection resistor R1 and the second detection resistor R2. Therefore, circuit structure is simplified, and a loss is reduced.

Figure 9:
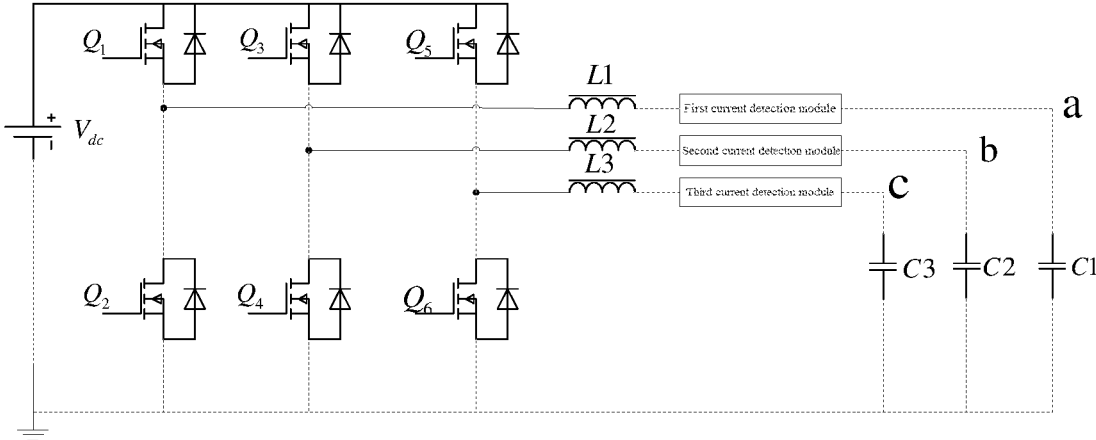
FIG. 9 is a schematic structural diagram of a protection circuit applied to a three-phase inverter circuit according to an embodiment of the present disclosure.
Figure 10:
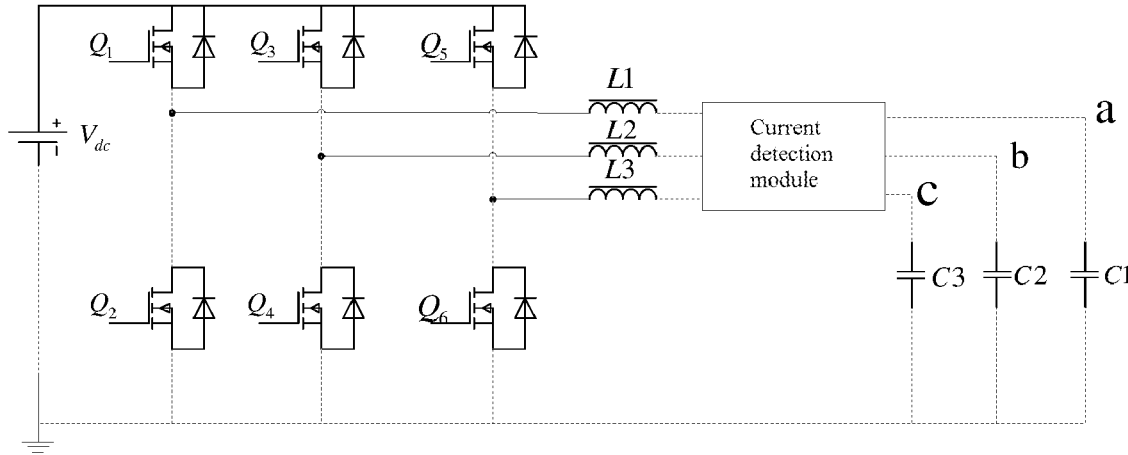
FIG. 10 is a schematic structural diagram of a protection circuit applied to a three-phase inverter circuit according to another embodiment of the present disclosure.

In a case that the inverter circuit is a three-phase inverter circuit, a structure of the circuit is as shown in FIG. 9. FIG. 9 is a schematic structural diagram of a protection circuit applied to a three-phase inverter circuit according to an embodiment of the present disclosure. FIG. 9 shows six switch transistors, namely switch transistors Q1, Q2, Q3, Q4, Q5 and Q6. A first current detection module is configured to detect a current between a first output terminal of the inverter circuit and phase a of a power grid. A second current detection module is configured to detect a current between a second output terminal of the inverter circuit and phase b of the power grid. A third current detection module is configured to detect a current between a third output terminal of the inverter circuit and phase c of the power grid. Each of the three current detection modules is connected to a comparator and a control module, and a connection thereof may be with reference to FIG. 8. In addition, the three current detection modules may be integrated as a single current detection module that is configured to detect currents between the power grid and each of the three output terminals of the three-phase inverter circuit. FIG. 10 is a schematic structural diagram of a protection circuit applied to a three-phase inverter circuit according to another embodiment of the present disclosure. As shown in FIG. 10, the current detection module is connected to a comparator and a control module, and a connection thereof may be with reference to FIG. 8.

Figure 11:
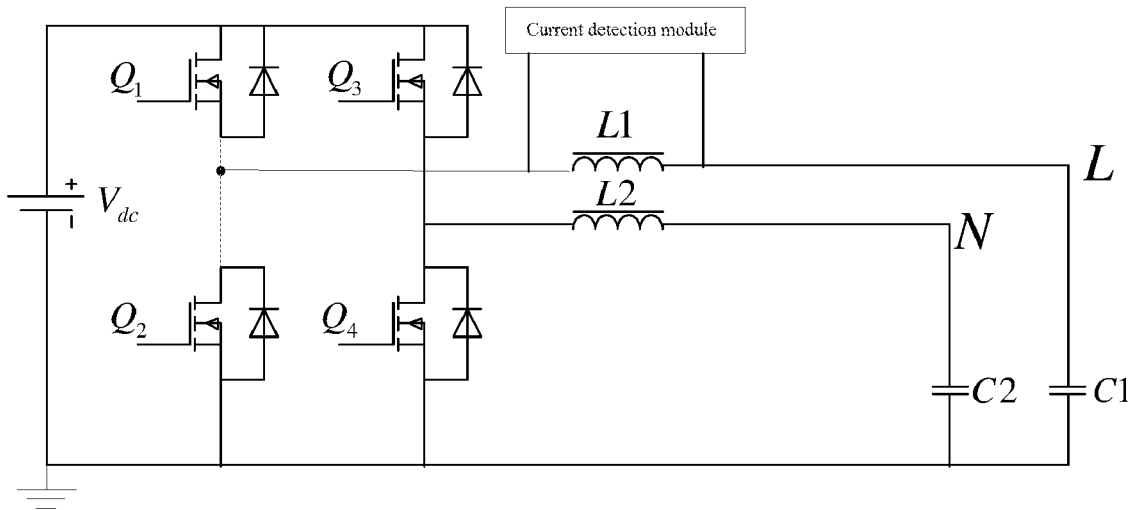
FIG. 11 is a schematic structural diagram of a protection circuit applied to an inverter circuit according to an embodiment of the present disclosure.

In addition, connection of the current detection module between the filter inductor and the power grid may cause a loss and a complex circuit structure. Therefore, in the present disclosure, the current detection module may be connected in parallel with the filter inductor, and detects a voltage across the filter inductor, so as to obtain the current in the filter inductor. FIG. 11 is a schematic structural diagram of a protection circuit applied to an inverter circuit according to an embodiment of the present disclosure. As shown in FIG. 11, the current detection module is connected to a comparator and a control module, and a connection thereof may be with reference to FIG. 8.

Figure 12:
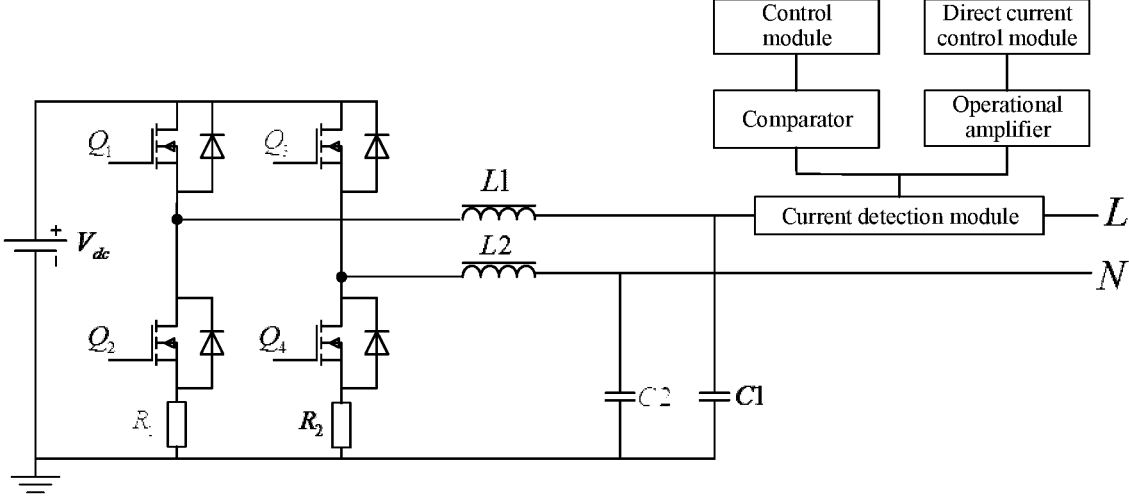
FIG. 12 is a schematic structural diagram of a protection circuit applied to an inverter circuit according to another embodiment of the present disclosure.

In an embodiment of the present disclosure, the current detection module is connected with the power grid and both the filter inductor and the filter capacitor, as shown in FIG. 12, for a further detection of the current between the inverter circuit and the power grid and a further detection of the direct current component of the current. FIG. 12 is a schematic structural diagram of a protection circuit applied to an inverter circuit according to an embodiment of the present disclosure. In FIG. 12, the current detection module is connected to a comparator and a control module, and the current detection module is further connected to an operational amplifier and a direct current control module, so that a direct current component of a detected current can be determined. In a case that the direct current component is greater than a preset direct current, the direct current control module switches off the switch transistors in the inverter circuit. Apparently, the present disclosure is not limited to determining the direct current component of the detected current and controlling the switch transistors by using the operational amplifier and the direct current control module.

It should also be noted that in the specification, relational terms such as "first" and "second" are merely for distinguishing one entity or operation from another, rather than indicating or implying an actual relationship or order of these entities or operations. Furthermore, terms "include", "comprise" or any other variants thereof are intended to be non-exclusive. Therefore, a process, method, article or apparatus including a series of elements includes not only the elements but also other elements that are not enumerated or other elements inherent to such process, method, article or apparatus. Unless expressively limited otherwise, a process, method, article or apparatus limited by "comprising/including a(n) . . . " does not exclude existence of another identical element in such process, method, article or apparatus.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Therefore, the present application is not limited to the embodiments described herein, but should be in accordance with the broadest scope consistent with the principle and novel features disclosed herein.

The invention claimed is:

1. A circuit protection method, applied to an inverter circuit, comprising:

receiving a current between an output terminal of the inverter circuit and a power grid;

determining, based on the current, whether a current abnormality occurs; and controlling to switch off switch transistors in the inverter circuit, on determining that a current abnormality occurs;

wherein a filter inductor is connected with the output terminal of the inverter circuit and the power grid, a filter capacitor is connected to the output terminal of the inverter circuit, a first terminal of the filter capacitor is connected to a second terminal of the filter inductor and the power grid, a second terminal of the filter capacitor is connected to a negative electrode of a bus capacitor of the inverter circuit;

the receiving a current between an output terminal of the inverter circuit and a power grid comprises: receiving a current between the power grid and both the filter capacitor and the filter inductor; and the current between the power grid and both the filter capacitor and the filter inductor is tested to determine whether the current meets a requirement of a grid standard, and the switch transistors are switched off in a case that the current does not meet the requirement.

2. The circuit protection method according to claim 1, wherein the inverter circuit is a single-phase inverter circuit;

the receiving a current between an output terminal of the inverter circuit and a power grid comprises:

receiving a first current between a first output terminal of the inverter circuit and a live line of the power grid, and a second current between a second output terminal of the inverter circuit and a neutral line of the power grid; and the determining, based on the current, whether a current abnormality occurs comprises:

determining, based on at least one of the first current and the second current, whether the current abnormality occurs; and proceeding to the controlling to switch off switch transistors in the inverter circuit, on determining that the current abnormality occurs.

3. The circuit protection method according to claim 1, wherein the inverter circuit is a three-phase inverter circuit;

the receiving a current between an output terminal of the inverter circuit and a power grid comprises:

receiving a first current between a first output terminal of the inverter circuit and phase a of the power grid, a second current between a second output terminal of the inverter circuit and phase b of the power grid, and a third current between a third output terminal of the inverter circuit and phase c of the power grid; and the determining, based on the current, whether a current abnormality occurs comprises:

determining, based on one or more of the first current, the second current and the third current, whether the current abnormality occurs; and proceeding to the controlling to switch off switch transistors in the inverter circuit, on determining that the current abnormality occurs.

4. The circuit protection method according to claim 1, wherein the determining, based on the current, whether a current abnormality occurs comprises:

comparing the current with a set current, and determining that the current abnormality occurs in a case that the current is greater than the set current.

5. The circuit protection method according to claim 1, further comprising:

detecting a power frequency signal from the current;

calculating a direct current component based on the power frequency signal;

determining whether the direct current component is greater than a preset direct current; and controlling to switch off the switch transistors in the inverter circuit, in a case that the direct current component is greater than the preset direct current.

6. A circuit protection system, comprising:

a signal receiver, configured to receive a current between an output terminal of an inverter circuit and a power grid;

a detector, configured to determine, based on the current, whether a current abnormality occurs, and trigger a controller on determining that the current abnormality occurs; and the controller, configured to control to switch off switch transistors in the inverter circuit;

wherein a filter inductor is connected with the output terminal of the inverter circuit and the power grid, a filter capacitor is connected to the output terminal of the inverter circuit, a first terminal of the filter capacitor is connected to a second terminal of the filter inductor and the power grid, a second terminal of the filter capacitor is connected to a negative electrode of a bus capacitor of the inverter circuit;

the current between the output terminal of the inverter circuit and the power grid is received by: receiving a current between the power grid and both the filter capacitor and the filter inductor; and the current between the power grid and both the filter capacitor and the filter inductor is tested to determine whether the current meets a requirement of a grid standard, and the switch transistors are switched off in a case that the current does not meet the requirement.

7. A circuit protection apparatus, comprising:

a memory, storing a computer program; and a processor, configured to execute the computer program to:

detect a current between an output terminal of the inverter circuit and the power grid;

determine, based on the current, whether the current abnormality occurs; and control to switch off the switch transistors in the inverter circuit, in a case that the comparator determines that the current abnormality occurs;

wherein a filter inductor is connected with the output terminal of the inverter circuit and the power grid, a filter capacitor is connected to the output terminal of the inverter circuit, a first terminal of the filter capacitor is connected to a second terminal of the filter inductor and the power grid, a second terminal of the filter capacitor is connected to a negative electrode of a bus capacitor of the inverter circuit;

the current between the output terminal of the inverter circuit and the power grid is detected by: detecting a current between the power grid and both the filter capacitor and the filter inductor; and the current between the power grid and both the filter capacitor and the filter inductor is tested to determine whether the current meets a requirement of a grid standard, and the switch transistors are switched off in a case that the current does not meet the requirement.

8. The circuit protection apparatus according to claim 7, wherein the inverter circuit is a single-phase inverter circuit; and the processor is further configured to:

receive a first current between a first output terminal of the inverter circuit and a live line of the power grid, and a second current between a second output terminal of the inverter circuit and a neutral line of the power grid;

determine, based on at least one of the first current and the second current, whether the current abnormality occurs control to switch off switch transistors in the inverter circuit, on determining that the current abnormality occurs.

9. The circuit protection apparatus according to claim 7, wherein the inverter circuit is a three-phase inverter circuit; and the processor is further configured to:

receive a first current between a first output terminal of the inverter circuit and phase a of the power grid, a second current between a second output terminal of the inverter circuit and phase b of the power grid, and a third current between a third output terminal of the inverter circuit and phase c of the power grid;

determine, based on one or more of the first current, the second current and the third current, whether the current abnormality occurs; and control to switch off switch transistors in the inverter circuit, on determining that the current abnormality occurs.

10. The circuit protection apparatus according to claim 7, wherein the processor is further configured to:

compare the current with a set current, and determine that the current abnormality occurs in a case that the current is greater than the set current.

11. The circuit protection apparatus according to claim 7, wherein the processor is further configured to:

detect a power frequency signal from the current;

calculate a direct current component based on the power frequency signal;

determine whether the direct current component is greater than a preset direct current; and control to switch off the switch transistors in the inverter circuit, in a case that the direct current component is greater than the preset direct current.

* * * * *